United States Patent [19]
Davis et al.

[11] 3,768,875
[45] Oct. 30, 1973

[54] ADAPTIVE CONTROL FOR FLUID PRESSURE BRAKING SYSTEM

[75] Inventors: Dennis J. Davis; Dennis J. Sudnick; John E. Juhasz; Sham Kurichh, all of Elyria, Ohio

[73] Assignee: The Bendix Corporation, South Bend, Ind.

[22] Filed: May 8, 1972

[21] Appl. No.: 251,530

Related U.S. Application Data

[62] Division of Ser. No. 75,314, Sept. 25, 1970, Pat. No. 3,667,609.

[52] U.S. Cl. .................. 303/21 F, 91/452, 91/454, 303/40, 303/69
[51] Int. Cl. ............................................. B60t 8/00
[58] Field of Search .................... 91/449, 452, 454; 137/596.14, 596.15, 608, 625.6, 625.64; 251/30, 129, 137; 303/21 F, 40, 58, 69, 74

[56] References Cited
UNITED STATES PATENTS

| | | | |
|---|---|---|---|
| 2,970,611 | 2/1961 | Hoge | 91/452 X |
| 3,080,887 | 3/1963 | Brandenberg | 91/454 X |
| 3,545,817 | 12/1970 | Yarber | 303/21 F UX |
| 3,704,047 | 11/1972 | Yarber | 303/21 F X |

FOREIGN PATENTS OR APPLICATIONS

1,961,039   6/1971   Germany .......................... 303/21 F

Primary Examiner—Milton Buchler
Assistant Examiner—Stephen G. Kunin
Attorney—Ken C. Decker

[57] ABSTRACT

An adaptive fluid pressure braking system responsive to wheel deceleration and acceleration for cyclicly decreasing and increasing braking effort at optimum levels to prevent wheel lock-up and provide maximum deceleration. The system includes band control means responsive to a pair of pre-selected wheel acceleration levels whereby, instead of taking corrective action as soon as sensed, whenever wheel acceleration during a preceding cycle is less than the lower level or greater than the upper level, a signal is generated whereby corrective action is taken during the next cycle. Where maximum wheel acceleration falls between the pre-selected levels no corrective action signal is generated for the next cycle. The corrective action may comprise a greater rate of decrease in braking pressure during the next cycle or a lesser rate of decrease in pressure.

5 Claims, 5 Drawing Figures

Patented Oct. 30, 1973 3,768,875
3 Sheets-Sheet 1
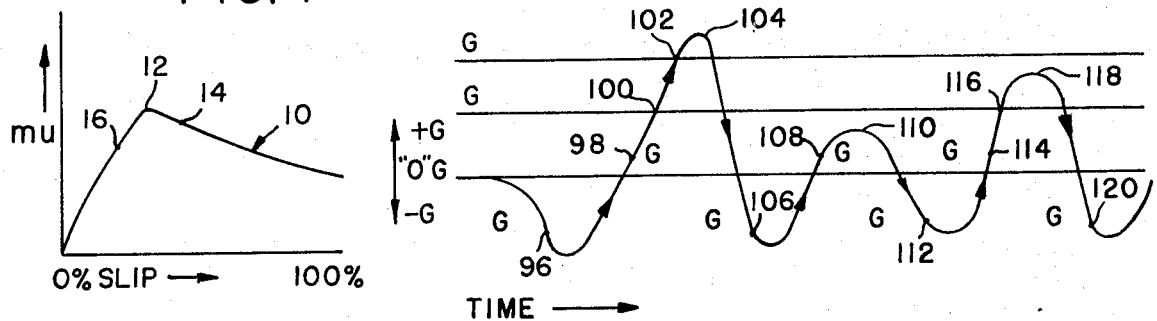
FIG. 1
FIG. 2
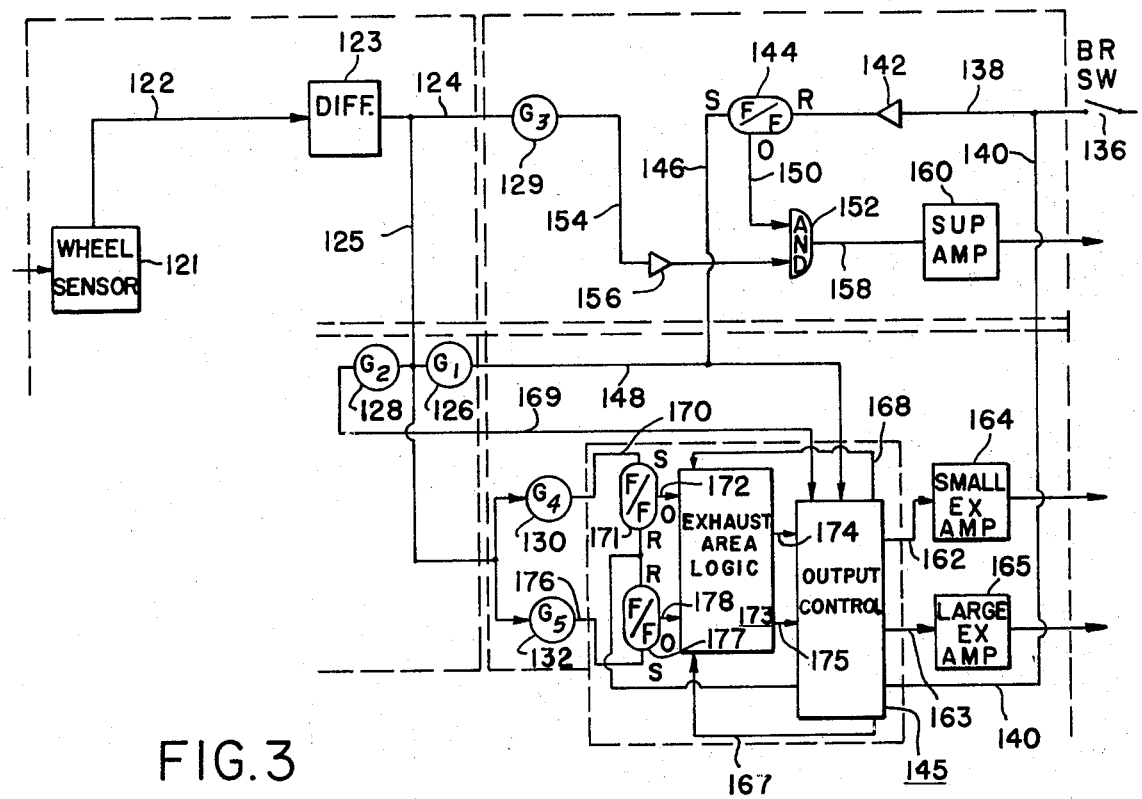
FIG. 3

Patented Oct. 30, 1973

ADAPTIVE CONTROL FOR FLUID PRESSURE BRAKING SYSTEM

This is a division, of application Ser. No. 75,314, filed Sept. 25, 1970 now U. S. Pat. No. 3,667,609.

DESCRIPTION OF THE INVENTION

This invention relates to fluid pressure braking systems and more particularly to adaptive anti-lock braking control for fluid pressure braking systems.

Adaptive control for fluid pressure braking systems is known in the art and the broad purpose of such systems is to prevent wheel lock-up and consequent skidding during heavy brake application while, at the same time, the brakes are applied with the optimum force to stop the vehicle in the shortest possible distance from the prevailing road conditions. Such systems must operate by cycling between the application and relief of braking pressure with the application and relieving points being desirously on opposite sides of the peak of a Mu-slip curve which is recognized in the art as being a plot of tire-to-road coefficient of friction against wheel slip between free rolling (0 percent slip) and skidding (100 percent slip). In practice, adaptive braking systems endeavor to apply braking pressure up to a pre-selected point beyond the peak of the curve in the direction of 100 percent wheel slip and at this point braking force is relieved to a lower level permitting the wheel to accelerate to a point where wheel slip is on the opposite side of the peak of the curve whereupon the braking pressure is re-applied and the cycle is repeated until the vehicle is brought to a stop.

Heretofore, adaptive braking systems have employed control means which, upon sensing a changed road condition have attempted to take immediate correction action, usually by relieving braking pressure. The difficulty with these systems is that they simply cannot respond as quickly as conditions change and braking is consequently subject to "overshoot" whereby, for example, far more braking pressure may be relieved or applied than is appropriate for the prevailing conditions and once the system overshoots it is then too late to take the proper corrective action. Additionally, overshooting expends, in the case of air brakes, far more reservoir pressure than is necessary and stops controlled by the system of the prior art are often rough, erratic and uncertain and there is the possibility that the driver may periodically lose steering control during momentary wheel lock-up as excessive pressure overshoot is fed to a brake actuator during the application phase of an adaptive braking cycle.

The broad object of the present invention is to overcome the problems of overshoot as explained above by providing an improved braking control system which does not endeavor to make an immediate correction during any phase of a braking cycle but rather utilizes a signal generated in response to a sensed changed condition during one cycle to take corrective active, not during the same cycle in which the changed condition was sensed, but during the next cycle.

More particularly, it is an object of the invention to provide an adaptive braking system which includes band control means responsive to wheel acceleration during one phase of a braking cycle to generate a signal which will vary the rate of pressure relief during the next cycle depending upon whether wheel acceleration during the first cycle was above or below one or more pre-selected wheel acceleration levels. The acceptable pre-selected acceleration levels may be between upper and lower limits whereby if the maximum wheel acceleration is greater or less than these limits during one cycle, a signal is generated whereby during the next cycle correction action is taken to increase or decrease the rate of pressure change in the brake actuator. If maximum wheel acceleration during the preceding cycle falls between the limits, no correction signal is generated and during the next cycle the rate of pressure change of the preceding cycle is repeated.

Other objects and their attendant advantages will become apparent as the following detailed description is read in conjunction with the accompanying drawings wherein:

FIG. 1 is a representative graph of a typical Mu-slip curve;

FIG. 2 is a graphical depiction of the mode of operation of the system of the present invention;

FIG. 3 is a schematic diagram showing the interrelationship of principal components of a system incorporating the present invention;

Figure 4:
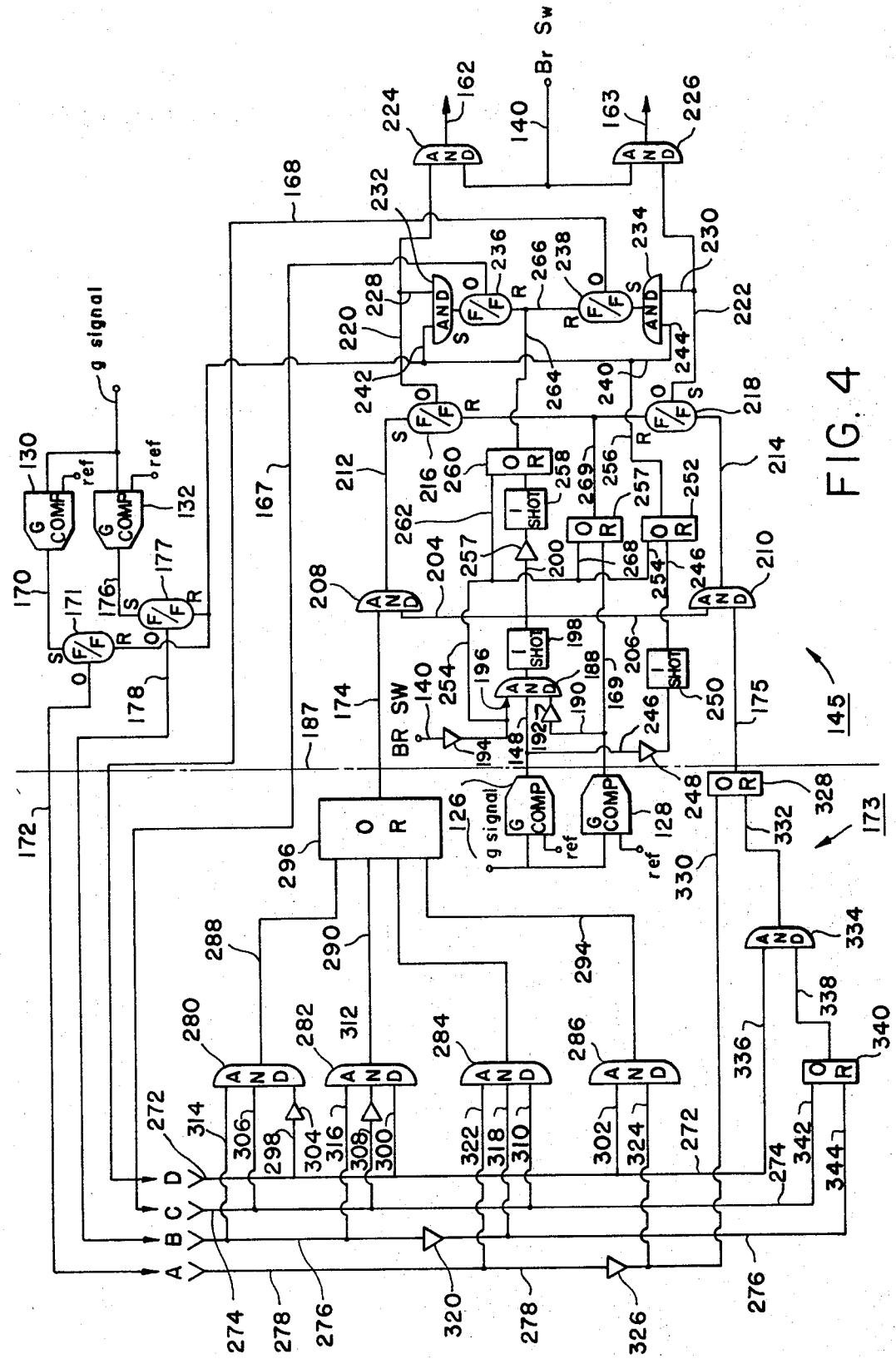
FIG. 4 is a detailed schematic diagram of logic and control circuits which may be utilized with the present invention.

Referring now to the drawings and particularly to FIG. 1 thereof the numeral 10 represents the typical curve of a plot of tire-to-road coefficient of friction (Mu) against wheel slip which ranges from 0 percent slip where a wheel has synchronous or free-rolling speed to 100 percent slip where the wheel is locked up and in complete skidding condition. Ideally, optimum braking force should be that which provides a percentage of wheel slip at the peak 12 of the Mu slip curve but because as a practical matter it is not possible to apply this precise amount of braking, the ideal braking force is approximated by applying and relieving braking pressure so that the percentage of wheel slip cycles to opposite sides of the curve peak with braking pressure increasing, for example, until the percentage of wheel slip is at the point 14 beyond the peak and approaching a skidding condition at which point braking pressure is decreased to a lower value permitting the wheel to recover toward synchronous speed and its percentage of slip to decrease to a point on the opposite side of the peak 12, say, to the point 16 whereupon braking force is increased and the cycling continues until the vehicle is brought to a stop.

The system of the present invention differs from prior art adaptive systems in that immediate corrective action is not attempted during any one cycle but rather an instantaneous corrective signal is generated by a changed condition during one cycle which signal is utilized to take corrective action during the next cycle so that there is always ample time for the system to respond to changed conditions without taking greater corrective action than is required or "over-shooting," as this term is recognized in the art.

It should be understood at the outset that the adaptive braking systems known to the art and including the present system, are designed to be non-functional except when wheel lock-up is imminent. Because wheel-lock up is not a factor in the vast majority of braked stops, braking systems for the most part operate precisely as if the adaptive systems were not a part thereof. However, when wheel lock-up would occur as during a panic application by the operator, or during a normal brake application on an icy road or during brake application on an unloaded vehicl where wheel bounce is encountered, under these circumstances the adaptive system functions, with the most important consideration being given to the continued steering control by the driver of the vehicle throughout the braking operation, that is to say, preservation of lateral stability of the vehicle, and secondary consideration being given to the shortest possible stopping distance, it being recognized in the art that so long as the driver has steering control throughout the braking operation, he is given not only the opportunity to stop the vehicle before an accident occurs but also the opportunity to steer the vehicle clear of a potential accident which he cannot do if the wheels are in a locked, skidding condition.

Figure 5:
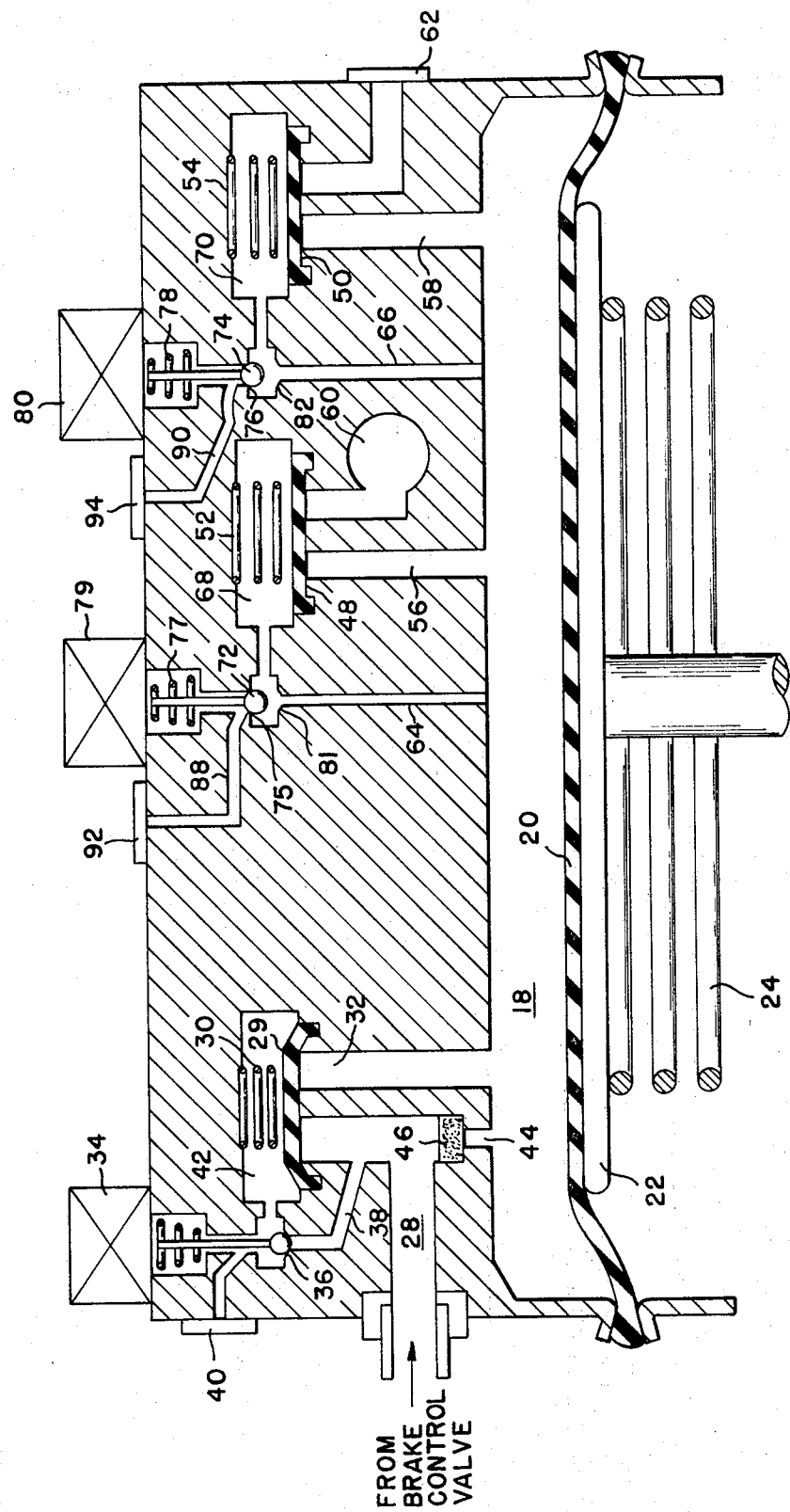
FIG. 5 is a schematic representation of a fluid pressure brake actuator equipped with pressure modulating control valve means constructed in accordance with the present invention.

As will become more apparent hereinafter, the control system of the invention has established points at which it responds to pre-selected negative or positive wheel acceleration and representative braking cycles as controlled by the system of the present invention are illustrated graphically in FIG. 2 and this will be considered in conjunction with FIG. 5 which is somewhat schematic representation of an actual brake actuator and modulator valve utilizing the adaptive controls of the present invention.

Though the principles of the invention are susceptible of use with other types of braking systems, it will be described in connection with a compressed air braking system for a single vehicle wheel and with reference to FIG. 5 the numeral 18 designates a brake chamber having a fluid pressure diaphragm 20 therein which engages the usual push plate 22 urged by a spring 24 to a brake release position. When fluid pressure is admitted to the chamber 18, the diaphragm is moved against the force of the spring to apply the brakes. During normal braking, when the operator depresses the brake pedal fluid pressure flows from the usual brake valve through a supply passage 28, past a diaphragm valve 29 which is raised by supply pressure against the downward force of a light spring 30, through a supply port 32 controlled by the valve 29 and into the brake chamber 18. When the brake pedal is released, the fluid in the brake chamber 18 escapes to atmosphere via the brake valve (or a quick release valve) in the usual way.

As will become apparent hereinafter, during the adaptive braking mode a circuit is completed through a brake valve switch to a solenoid 34 which raises a valve element 36 from the position shown disconnecting a passage 38 in direct communication with supply passage 28 from an exhaust check valve 40 to a position disconnecting a pressure cavity 42 above the diaphragm valve 29 from the exhaust check valve 40 while connecting the cavity 42 to the passage 38. Upon this occurrence, supply pressure fluid is fed to the upper side of the diaphragm 29 resulting in equal pressure above and below the diaphragm permitting the spring 30 to move the diaphragm to a position closing off the inlet port 32 which action decreases the effective area on the lower side of the diaphragm valve from that on the upper side so that the net force of fluid pressure acting downwardly on the diaphragm 29 in conjunction with the light spring 30 retains the diaphragm in this position so long as the solenoid 34 is energized, which, as will be seen, is substantially almost entirely through-out the period when the brake is being controlled in the adaptive mode. Under these conditions, fluid pressure is supplied to the brake chamber at a controlled rate through a choked orifice 44 which is at all times in open communication with the supply passage 28 through a filter 46.

From the foregoing, it will be seen that so long as the brake pedal is depressed and the solenoid 34 is energized, there is a constant flow of fluid from the supply passage 28 into the brake chamber 18 by way of the choke 44. Reduction of pressure in the brake chamber is controlled by a pair of exhaust valves 48, 50 which are of the diaphragm type normally urged to closed position by springs 52, 54 to interrupt communication between a small exhaust passage 56 and a large exhaust passage 58, respectively, with their atmospheric ports 60, 62. When closed, valves 48, 50 have larger effective areas on their upper sides than on their lower sides with the former being normally communicated with the interior of the pressure chamber 18 by way of respective passages 64, 66 and pressure control cavities 68, 70 whereby brake chamber pressure acts in concert with the springs 52, 54 on the upper sides of the valve members 48, 50 to retain them in the closed position shown.

Each of passages 64, 66 may be disconnected from its respective cavity 68, 70 by the operation of control valve members 72, 74 which may be moved in response to energization of respective solenoids 79, 80 away from exhaust valve seats 75, 76 against which the valve members are normally urged by springs 77, 78, and into engagement with valve seats 81, 82 at the upper ends of the passages 64, 66. When the passages are thus disconnected from the cavities 68, 70, the latter are simultaneously connected to atmosphere by way of passages 88, 90 and exhaust check valves 92, 94. With the cavities 68, 70 at atmospheric pressure, it will be apparent that the pressure in brake chamber 18 can readily move the valves 48, 50 off their seats to connect the interior of the chamber with atmosphere by way of the respective small and large exhaust passages 56, 58 and atmospheric ports 60, 62.

As will become apparent hereinafter, when only the solenoid 79 is energized, there is a relatively slow rate of exhaust of fluid pressure from the brake chamber by way of the small area exhaust passage 56. On the other hand, when only the solenoid 80 is energized, there is a greater rate of pressure exhaustion to atmosphere through the larger exhaust area passage 58 than was possible through only the small exhaust passage 56. When both of the solenoids 79, 80 are energized, it will be apparent that fluid pressure may escape from the chamber 18 to atmosphere simultaneously through both of the exhasut passages 56, 58 and this is the greatest possible rate of exhaust. Thus, it will be seen that three exhaust areas are available to control the rate of exhaust from chamber 18; the smaller area occurring when only the small exhaust solenoid 79 is energized; an intermediate area occuring when only the large exhaust solenoid 80 is energized and a maximum area occuring when both of the solenoids are energized.

As previously mentioned, during adaptive braking, fluid pressure in the supply passage 28 is in constant communication with the brake chamber 18 through the choke 44 and the increase and decrease of the brake chamber pressure is controlled solely by the operation of the exhaust solenoids 79, 80 either separately or together to control the rate of pressure decrease in the brake chamber.

Referring now to FIG. 2, when the brake is first applied the vehicle wheel is traveling at "0" G acceleration, that is to say, it is moving at constant velocity, but assuming that substantially full reservoir pressure is initially applied to the brake chamber 18, as during a panic stop when the wheels would otherwise lock-up, as the wheel decelerates toward a skidding condition, at a pre-selected degree of deceleration G1, designated by the numeral 96, and approximately at a wheel slip percentage indicated by the numeral 14 in FIG. 1, the solenoid 34 is energized to close the supply valve 29 and cut off further supply of pressure from the supply passage 28 to the brake chamber 18 by way of the supply port 32 with pressure now being supplied to the chamber 18 solely by way of the choke 44. Simultaneously with the closing of the supply valve at the point G1, one of the exhaust solenoids is energized and, in accordance with the invention, during the initial cycle of an adaptive braking mode, the solenoid 80 controlling the large exhaust passage 58 or the intermediate exhaust area is energized to permit the escape of fluid pressure from the chamber 18 at a greater rate than it can be supplied through the choke 44 whereby braking force is relieved and the wheel eventually accelerates. At a pre-selected level of acceleration G2, designated by the numeral 98 in FIG. 2 and at approximately a wheel slip percentage indicated by the numeral 16 in FIG. 1, the solenoid 80 is deenergized allowing control valve 74 to be closed against seat 76 by spring 78 and connecting cavity 70 to pressure in chamber 18 so as to close exhaust valve 50 and cut off further escape of pressure from chamber 18. Because supply valve solenoid 34 is still energized pressure now begins to build up relatively slowly in chamber 18 through the choke 44 and as the pressure increases the wheel accelerates until the pressure reaches a level at which the wheel commences to decelerate.

Let it now be assumed for purposes of illustration that the amount of fluid pressure released from the chamber 18 by the intermediate exhaust area was excessive so that the wheel accelerates beyond the desired point 14 on the Mu-slip curve of FIG. 1 before the pressure supplied through the choke 44 can again cause the wheel to decelerate. With reference to FIG. 2, let it also be assumed that the wheel accelerates through a first pre-selected acceleration level indicated by the numeral 100 at the line G4 and then through a pre-selected higher second acceleration level indicated by the numeral 102 at a second line G5 with the acceleration continuing to a peak 104 at which the wheel accelerates a a lesser level and finally decelerates. When acceleration reaches or slightly exceeds the G5 level, in accordance with the invention, a signal is generated which is placed in a memory, as will be further explained hereinafter, such that when the wheel again decelerates to a second G1 level at 106 the memory operates to instruct the system to open a smaller exhaust area than was opened on the first cycle, that is to say, in the assumed case when the second G1 point 106 is reached the memorized signal effects energization of only the solenoid 79 controlling the small exhaust passage 56 so that the brake chamber pressure is exhausted to atmosphere at a slower rate than during the initial cycle.

As before, the wheel eventually accelerates and at the next G2 level 108 the exhaust solenoid 79 is deenergized to effect closing of the small area exhaust valve 48.

Let it now be assumed that due to changing road conditions or for other reasons insufficient pressure was relieved during the preceding cycle to ensure recovery of wheel acceleration to the optimum band established by the lines G4 and G5 that is to say, peak acceleration is to the point 110 short of the G4 level. Under these circumstances, a signal which was stored in a memory at the last G1 point 106 (and capable of being modified in the event that wheel acceleration did in fact reach the optimum G4, G5 band) causes opening of the next larger exhaust area than the previous cycle when the next G1 point exhaust 112 is reached. Because the solenoid 79 for the small exhaust was opened during the previous cycle, the memory now at the third G1 point 112 causes the small solenoid 79 to remain deenergized while energizing the large exhaust solenoid 80 to connect the interior of the brake chamber to atmosphere through the intermediate area exhaust provided by the large exhaust passage 58. It should be noted here that if on the previous cycle the intermediate area exhaust, i.e., only the large exhaust passage 58, had been opened, the signal stored in the memory at the last G1 point 106 would have instructed the system to open the next higher exhaust area at the next G1 point 112, that is to say, both exhaust passages 56, 58, provided, of course, that that signal had not been modified by a wheel acceleration exceeding the G4 level.

To continue the example wherein it is assumed that the intermediate exhaust area, i.e., the large passage 58, was opened at G1 point 112, when this occurs a greater amount of pressure is relieved from the brake chamber than during the previous cycle so that the wheel now accelerates first through the third G2 point 114 where the large exhaust valve closes due to deenergization of solenoid 80 and then through the G4 level to the point 116 where the memory set in at the last G1 is modified and memorized. Should this modified signal be not modified yet again by arrival of the wheel acceleration at the G5 level (and in the example it is not, as can be seen by the peak acceleration at the point 118, short of the G5 level) when the wheel again decelerates to the fourth G1 point 120, the memorized modified signal instructs the system to repeat the same exhaust area opening as during the previous cycle and so long as the wheel continues to accelerate to the G4 level but not to the G5 level the same exhaust area as during the previous cycle will be repeated. However, should a sudden change in road conditions cause a wheel to accelerate beyond the G5 line, as might occur when the wheel rolls from wet pavement onto dry, then a modifying signal is generated at the G5 point instructing the system to open the next smaller exhaust area at the next G1 level. Where the change in road conditions prevents the wheel acceleration from reaching the G4 level, as when the wheel rolls from dry to wet payment, the signal memorized at the last G1 point automatically effects an increase in the exhaust area at the arrival of the wheel acceleration at the next G1 level.

From the foregoing it will be seen that the system of the invention, as will become clear hereinafter, unlike prior art systems does not attempt an immediate correction when a wheel suddenly accelerates or decelerates too much due to a sudden change in road conditions, but rather the system of the invention merely detects the change and then utilizes a stored signal already generated to step up the exhaust area at the next pressure relief cycle if the wheel acceleration peaks too low, or to modify that signal if the wheel acceleration peaks too high in order to step down the exhasut area. On the other hand, should wheel acceleration be optimum the initial step-up signal is modified to not step up the exhaust area at the beginning of the next cycle but rather to repeat the exhaust area of the previous cycle.

The control system illustrated generally in FIG. 3 and in greater detail in FIG. 4 will be described almost exclusively in terms of positive logic components. In the illustrated circuits, these components comprise comparators, AND and OR gates, one-shots, flip-flops, and inverters. The flip-flops have set and reset inputs and a single output all uniformly designated in the drawings by the letter S, R and O, respectively. A flip-flop has either a positive output in a set state or a zero output in a re-set state with the output signal remaining even after the set or re-set signal is extinguished and until a new signal is received at one of the inputs. The inverters, which are uniformly illustrated in the drawings as triangular arrows pointing in the direction of signal flow, convert a positive input to zero output and vice versa.

With reference to FIG. 3, the numeral 121 designates a wheel speed sensor which may be of the type which converts wheel speed into a frequency proportional electrical signal which in turn is converted into a DC voltage proportional to speed. This is fed by line 122 to a differentiator 123 producing a DC voltage output signal proportional to acceleration which is fed to comparators 126, 128, 129, 130 and 132, labeled G1, G2, G3, G4, and G5 respectively. These comparators are of the type which accept linear inputs and switch from a zero to positive output whenever a pre-set reference input is exceeded. Hereinafter, a logic component will usually be termed "conducting" when it has a positive logic output and "non-conducting" when it has a zero logic output.

The G1 comparator 126 is provided with a reference input whereby the comparator conducts to close the supply valve 29 in FIG. 5 and open one or both exhaust valves whenever a signal is received from the differentiator proportional to a negative acceleration (deceleration) of the vehicle wheel to the point G1 already described in connection with FIG. 2. The comparator output continues positive until the wheel acceleration level is above that of the reference input at which point the comparator output signal returns to the original non-conducting state.

The G2 comparator 128 has a reference input such that it conducts when a signal is received from the differentiator representing an acceleration of the wheel to the level of G2 in FIG. 2 at which point the exhaust valves are closed. As will become apparent, means are provided for retaining the supply valve solenoid 34 energized even though the exhaust valve solenoids are de-energized, except under certain conditions which will be described.

As in the case of the G1 and G2 comparators 126, 128 the G4 and G5 comparators 130, 132 have reference inputs whereby each becomes conducting when a respective acceleration level of the appropriate magnitude is delivered at the output of the differentiator.

The fifth comparator 129, which is labeled G3 in FIG. 3, effects opening of the normally closed supply valve by de-energizing the solenoid 34 whenever wheel acceleration goes to an abnormally high level. Normally, the G3 comparator 129 is non-conducting but has a reference input such that the comparator conducts when a signal representative of the high acceleration level is generated by the differentiator.

In order for the circuit of FIGS. 3 and 4 to operate there must be in addition to the acceleration signal from the differentiator, a signal from a brake switch schematically shown at 136 in FIG. 3 and which is moved to closed position upon depression of the brake pedal. Conveniently, the brake switch could be the same switch which controls the vehicle stop light.

With specific reference to FIG. 3 it will be seen that a line 138 and a branch line 140 are energized when the brake switch is closed. The line 138 contains an inverter 142 which de-energizes the line between its output and the reset input of a flip-flop 144 so that the reset input receives no signal when the brake switch is closed. The branch line 140 leads to an output control box 145 to condition the circuitry therein for operation so long as the brake switch is closed, the circuitry being rendered inoperative when the brake switch is opened by releasing the brake pedal.

Referring now back to flip-flop 144, it will be noted that the set input thereof is connected by a line 146 to the output line 148 of the G1 comparator 126 so that when the latter becomes conducting the flip-flop 144 is set by the G1 signal to a conducting state and the line 150 connected to the output of the flip-flop is energized. As can be seen, the line 150 leads to one input of an AND gate 152 whose other input is derived from the output of the G3 comparator 129 by way of a line 154 containing an inverter 156. As previously mentioned, the output of the G3 comparator 129 is usually zero with this being converted to a positive output by the inverter 156 so that the second input of the AND gate 152 is energized. Thus when a signal is received at the first input of the AND gate from the flip-flop 144, the output line 158 of the AND gate is energized to operate the supply valve amplifier 160 energizing the supply valve solenoid 34 of FIG. 5 to close the supply valve as previously explained. When the G1 signal and hence the set signal for flip-flop 144 is returned to the zero logic state as the wheel acceleration becomes less negative, the flip-flop continues to conduct to supply AND gate 152 and retain the supply valve amplifier energized and the supply valve closed so long as the output of the G3 comparator is logic zero.

In the event that the wheel accelerates to an extraordinary high level so that a G3 signal is produced in line 154, this signal will be converted to logic zero at the output of the inverter 156 to produce a logic zero at the second input of AND gate 152 so as to de-energize line 158, supply amplifier 160 and supply valve solenoid 34 to open the supply valve 29 and permit free fluid flow into the brake chamber 18 for a quick build up of pressure and consequent rapid slow down of the wheel.

It will be apparent that when the brake pedal is released the brake switch 136 is opened and the line 138 de-energized so that the inverter 142 now produces a positive logic signal at the reset input of flip-flop 144 to change it to a non-conducting condition and thus effect opening of the supply valve. At the same time, branch line 140 is de-energized to render the output control box 145 ineffective as previously mentioned.

Referring back now to the G1 comparator 126, when this becomes conducting by deceleration of the wheel to the pre-set G1 level a signal is fed by way of line 148 to the output control box 145 and, as previously explained in connection with FIG. 2, the circuitry is operated to produce an output signal in either or both of lines 162, 163 leading to small and large exhaust valve amplifiers 164, 165 to selectively energize the solenoids 79, 80 of FIG. 5 and effect opening of the exhaust valves. On the initial cycle, as previously explained, only the intermediate exhaust area, as this term has been defined hereinbefore, is opened; that is to say, only the line 163 controlling the large exhaust valve amplifier is energized.

As the wheel acceleration becomes less negative as a result of the opening of the intermediate exhaust valve during the first cycle, say, the wheel acceleration level reaches a point outside the reference level of the G1 comparator 126 and its signal is returned to zero logic. Upon this occurence either one or both of lines 167, 168 leading from the output control box 145 to a logic box 173 are energized and retained energized, as will be hereinafter explained until the next G1 signal is received. When the G1 comparator becomes non-conducting a flip-flop within the control box 145 maintains the line 163 energized so that the exhaust valve 50 remains open until the wheel accelerates to the conducting level of the G2 comparator 128 whereupon its output line 169 leading to the output control box 145 is energized to extinguish the signal in line 163 deenergizing the large valve solenoid 80 to effect closing of the large exhaust valve 50. This signal has no effect on any signals retained in the lines 167, 168. As previously mentioned, fluid pressure continues to flow to the brake chamber through the choke 44 though the wheel continues to accelerate until sufficient pressure has been built up to again slow the wheel. Should the wheel accelerate to the G4 level, the G4 comparator 130 becomes conducting to supply a signal by way of line 170 to the set input of a flip-flop 171 and the output of the flip-flop is fed by way of a line 172 into the exhaust area logic box 173 having a pair of outputs 174, 175 leading to the control box 145. Should the wheel continue to accelerate to the conducting level of the G5 comparator 132 its output line 176 is energized to provide a signal to the set input of a flip-flop 177 so that this becomes conducting to feed a signal into the exhaust area logic by way of its output line 178. The signals supplied to the logic box through the respective flip-flop outputs 172, 178 cooperate with the signals already fed into the exhaust area logic from the output control box 145 by way of lines 167, 168 to condition the exhaust area logic so that upon receipt of the next G1 signal one or both of the control box output lines 162, 163 are energized to open the appropriate exhaust area depending upon what level of acceleration was reached by the wheel during the last cycle. As will become apparent the signals carried by the logic box output lines 174, 175 ultimately effect energization of the respective small and large exhaust valve solenoids 79, 80 in response to the next G1 signal.

Referring now to FIG. 4, the circuitry in the exhaust area logic box 173 and in the output control box 145 are shown in more or less combined condition with a broken line 187 defining the approximate demarcation between the circuitry in the two boxes. The G1 and G2 comparators 126, 128 are shown in FIG. 4 as if they were physically within the exhaust area logic box but this is merely to facilitate explanation. Some components shown in FIG. 3 are not shown in FIG. 4 because they are not directly concerned with the output control or exhaust area logic. For example, the differentiator 123, the G3 comparator 129, the supply amplifier 160 and the controls for the supply amplifier are not shown in FIG. 4.

Referring now to the G1 comparator 126 in FIG. 4 it will be noted that its output line 148 leads to one input of an AND gate 188. The AND gate 188 has a second input derived from a branch line 190 connected to the output line 169 of the G2 comparator 128. The branch line 190 contains an inverter 192 which converts a zero output of the G2 comparator to a positive output at the second input of the AND gate 188. The AND gate 188 has a third input which is derived from a branch of the brake switch line 140 and which has an inverter 194 therein whose output is zero when the brake switch is closed. The line 140 beyond the inverter 194 leads into the third input of the AND gate 188 by way of a second inverter 196 which converts the zero output of inverter 194 to a positive input at AND gate 188 so that the latter becomes conducting when a G1 signal is transmitted thereto. The output of AND gate 188 is fed by way of a one-shot 198 to a line 200 having a pair of branch lines 204, 206 each connected to an input of respective AND gates 208, 210. The other inputs to the AND gates 208, 210 are the previously mentioned output lines 174, 175 from the logic box 173. The AND Gates 209, 210 have output lines 212, 214 leading to the set inputs of respective flip-flops 216, 218 whose output lines 220, 222 are each connected to one input of respective AND gates 224, 226 whose outputs comprise previously described lines 162, 163 leading to the respective small and large exhaust valve amplifiers 164, 165 shown in FIG. 3.

Connected to each of the lines 220, 222 are branch lines 228, 230 each leading to one input of respective AND gates 232, 234 having outputs leading to the set inputs of flip-flops 236, 238 whose outputs are the respective previously mentioned lines 167, 168 leading from the control box to the logic box.

The second input of the respective AND gates 232, 234 are derived from a common line 240 which is connected to the inputs by respective branch lines 242, 244. The line 240 is also connected to reset inputs of the flip-flops 171, 177 whose set inputs are connected to the output lines 170, 176 of the G4 and G5 comparators 130, 132, respectively.

The line 240 is connected to the output 148 of the G1 comparator 126 by way of a line 246 containing, in sequence, an inverter 248, a one-shot 250, and an OR gate 252 having a pair of inputs, one of which is the line 246 and the other of which is a branch line 254 connected to the brake switch line 140 downstream of its inverter 194 so that the upper input of the OR gate 252 is zero when the brake switch is closed. The output of OR gate 252 is connected by a line 256 to the line 240, it being apparent that when a G1 signal exists at the output of the G1 comparator, the inverter 248 changes this signal to a zero in the line 246 downstream of the inverter so that no signal is received in line 240 and the second inputs of the AND gates 232, 234 nor at the reset inputs of the respective G4 and G5 flip-flops 171, 177. However, when the G1 comparator becomes non-conducting by acceleration of the wheel beyond the reference level of the G1 comparator, its zero signal is converted to a positive signal by the inverter 248 to energize line 240 and render the AND gates 232, 234 conducting, providing a signal has been previously locked into the branch lines 228, 230 by a signal at the set inputs of either or both of the flip-flops 216, 218.

Referring back now to the line 200 which is connected to the output line 148 of the G1 comparator by means of the AND gate 188 and one-shot 198, it will be noted that beyond the branches 204, 206 leading to AND gates 208, 210, the line 200 passes through an inverter 257 and a one-shot 258 to one input of an OR gate 260 whose upper input is derived from a branch line 262 connected to the brake line 140 by way of the line 254 which, as previously mentioned, is de-energized when the brake switch is closed. The output of OR gate 260 is connected by line 264 to a line 266 leading to the reset inputs of the respective flip-flops 236, 238.

Referring now to the G2 comparator 128 in FIG. 4 it will be observed that its output line 169 leads to one input of an OR gate 267 whose other output is connected by a branch line 268 to the aforementioned brake switch branch line 254. The output of OR gate 267 is connected by a line 269 to a line 270 leading to the reset inputs of the respective flip-flops 216, 218. It will thus be seen that when a G2 signal is received at the reset inputs, the output signals of the flip-flops 216, 218 are de-energized, thus rendering the respective AND gates 224, 226 leading to he exhaust valve amplifiers non-conducting so that the exhaust valve solenoids are de-energized and the exhaust valves closed.

Referring now to the logic box 173, the four input lines, to wit, lines 167, 168 from the control box and the lines 172, 178 from the G4 and G5 comparators are connected respectively in the logic box to lines 272, 274, 276, 278. These lines are connected in various combinations to a series of AND gates 280, 282, 284, 286 each having respective output lines 288, 290, 292, 294 leading to the inputs of an OR gate 296 whose output comprises the aforementioned logic box output line 174 leading to the control box.

The line 272 is connected to AND gates 280, 282, 286 by way of branch lines 298, 300, 302, the branch line 298 containing an inverter 304. The line 274 is connected to AND gates 280, 282, 284 by way of branch lines 306, 308, 310 with the branch line 308 containing an inverter 312. The line 276 is connected to AND gates 280, 282, 284 by way of branch lines 314, 316, 318 with there being an inverter 320 in the line 276 between the branch ines 316, 318 leading to the AND gates 282, 284. The line 278 is connected to AND gates 284, 286 by way of branch ines 322, 324 with there being an inverter 326 in the line 278 between the branches 322, 324.

The second output line 175 of the logic box comprises the output of an OR gate 328 whose first input is connected by a branch line 330 to the line 278 downstream of inverter 326. The second input of the OR gate 328 is derived from a line 332 comprising the output of an AND gate 334 having an input connected by a line 336 to the line 272. The other input of AND gate 334 is derived from the line 338 comprising the output of an OR gate 340 whose upper input is connected by way of branch line 342 to line 274 and whose lower input is connected by way of branch line 344 to line 276 downstream of inverter 320.

The operation of the adaptive braking system will now be described following essentially the sequence of events already described in connection with FIG. 2. Before the brake is applied, it will be understood that the brake pedal switch 136 of FIG. 3 is open so as to de-energize lines 138, 140. With the input of the inverter 142 in line 138 at zero, the output of the inverter becomes positive to feed a reset signal to flip-flop 144 to render this non-conducting and de-energize the supply valve solenoid 34 of FIG. 5.

With reference now to FIG. 4 when brake switch branch line 140 is de-energized to AND gates 224, 226 controlling the exhaust valve solenoids of the pressure modulator valve become non-conducting to de-energize the exhaust valve amplifiers so that the exhaust valves are at all times closed when the brakes are off.

As described, the zero signal in the brake line 140 is converted by the inverter 194 in FIG. 4 to a positive signal which is converted back to a zero signal at one input of the AND gate 188 by a second inverter 196. However, the positive signal from the first inverter 194 is fed by way of line 254 and branch lines 262, 268, 254 to the respective upper inputs of OR gates 260, 267, 252. From OR gate 260 the signal derived from the open condition of the brake switch is fed by lines 264, 266 to the reset inputs of the flip-flops 236, 238. In like manner, this same signal is fed from OR gate 267 through lines 269, 270 to the reset inputs of flip-flops 216, 218 and the signal is also fed from OR gate 252 through lines 256, 240 to reset inputs of the G4 and G5 comparator flip-flops 171, 177.

From the foregoing, it will be observed that with the brakes off and the brake switch open all of the flip-flops are reset and their output lines, namely the lines 220, 222 leading from flip-flops 216, 218 to resepctive exhaust amplifier AND gates 224, 226, the lines 167, 168 and lines 172, 178 leading to the inputs of the exhaust area logic box from the respective flip-flops 236, 238 and 171, 177 are all de-energized. With the inputs to the logic box at zero, it will be observed that at least one input to each AND gate 280, 282, 284, 286 in the logic box is zero and consequently all of their output lines 288, 290, 292, 294 are de-energized so that the logic output line 174 from OR gate 296 and leading to the upper input of AND gate 208 in the control box is also de-energized. The inverters 320, 326 in the respective lines 276, 278 connected to the lines 172, 178 leading to the G4 and G5 comparator flip-flops 171, 177 convert the zero inputs to lines 276, 278 to positive signals at the outputs of the inverters and it will be observed that the line 278 downstream of the inverter 326 thus delivers a positive signal to the lower input of AND gate 210 in the control box by way of branch line 330, OR gate 328 and logic box output line 175. In like fashion the positive siggnal at the output of the inverter 320 in the line 276 is fed by way of branch ine 344, OR gate 340 and line 338 to one input of AND gate 334.

Now when the brake pedal is depressed, the brake switch 136 is closed so that the inverter 142 in FIG. 3 extinguishes the reset signal at the reset input of the flip-flop 144. In like manner, the inverter 194 shown in FIG. 4 effectively extinguishes the reset signal at all of the other flip-flop reset inputs and at the same time a positive signal is supplied by the brake switch line 140 through the inverter 196 to one input of the AND gate 188 whose other inputs are the output line 148 of the G1 comparator and the branch line 190 connected through inverter 192 to the output line 169 of the G2 comparator. Positive signals are also supplied from the brake switch line 140 to one of the inputs of each of the AND gates 224, 226 connected to the respective exhaust valve amplifiers.

Let it be assumed that the brake application is of such magnitude for prevailing tire-road conditions that wheel lock-up is likely in the absence of timely brake release. Under these conditions the wheel decelerates to a level whereby the differentiator 123 generates a signal equal to the reference signal of the G1 comparator 126 which now becomes conducting to produce a signal which is fed through the lines 148, 146 in FIG. 3 to the set input of flip-flop 144, thus rendering AND gate 152 conducting to energize the supply valve amplifier 160 and close the supply valve.

At the same time the G1 signal passes by means of the AND gate 188 in FIG. 4 (it being recalled that the other two inputs and AND gate 188 are already positive) and the one-shot 198 to energize the branch lines 204, 206 leading to one input of each of the AND gates 208, 210. As already demonstrated, the line 174 leading to the other input of upper AND gate 208 is de-energized so that the gate 208 is non-conducting. However, the other logic box output line 175 is already energized by the inverted zero signal in line 278 so that one input of AND gate 210 already has a signal awaiting the arrival from one-shot 198 of a first pulsed G1 signal at the other input of AND gate 210. When this latter signal is received, AND gate 210 conducts a pulsed signal by line 214 to the set input of flip-flop 218 to energize its output line 222 which in turn energizes the lower input of AND gate 226 whose upper input is already energized by the energized brake switch line 140. Thus the AND gate 226 becomes conducting to energize the large exhaust valve amplifier and effect opening of the large exhaust valve to connect the brake chamber to atmosphere through the intermediate area exhaust as intended by the invention.

When the pulsed signal at the set input of the flip-flop 218 decays to zero, the flip-flop continues to conduct until a signal is received at its reset input. It will be observed that when the line 222 at the output of flip-flop 218 is energized the branch 230 leading to one input of AND gate 234 is also energized. When the large exhaust valve is opened, the wheel eventually reaches an acceleration level beyond the reference level of the G1 comparator which at this point becomes non-conducting but because flip-flop 218 is still set, the lines 222, 230, and AND gate 226 remain energized. When the output of the G1 comparator goes to zero, but before the wheel accelerates to the G2 level, the zero G1 signal is conveted by the inverter 248 in line 246 to a positive signal at the output of the inverter which signal is fed by means of one-shot 250, OR gate 252, lines 256, 240 to branch lines 242, 244 leading to AND gates 232, 234. A signal is also fed by line 240 to the reset inputs of the flip-flops 171, 177 for the G4 and G5 comparators 130, 132. Because the second input 228 to AND gate 232 is not at this time energized, energization of branch line 242 has no effect. However, branch line 230 leading to one input of AND gate 234 is already energized as above explained and when the inverted zero G1 signal is received by branch line 244 at the other input of AND gate 234 it becomes conducting to supply a signal to the set input of flip-flop 238 to energize output line 168 leading to the line 272 within the logic box. Though flip-flop 238 is normally reset in response to what is in effect, a delayed G1 signal, because no G1 signal exists at this stage, the flip-flop 238 remains set and line 168 energized even after the pulsed signal is extinguished in the branch input line 244 leading to AND gate 234.

When the wheel now accelerates to the G2 level, that is to say, to the point 98 in FIG. 2, the G2 comparator becomes conducting and transmits a signal by way of line 169, OR gate 267 and lines 269, 270 to the reset inputs of flip-flops 216, 218 thus extinguishing the signal in the output line 222 of the flip-lfop 218, thereby rendering AND gate 226 non-conducting to de-energize the large exhaust valve solenoid and close the large exhaust valve. However, the flip-flop 238 continues in its set condition and line 168 leading to the logic box 173 remains energized.

As in the example depicted graphically in FIG. 2, let it be assumed that the wheel continues to accelerate to the G4 and G5 levels. Upon arrival at the G4 level the G4 comparator 130 transmits a signal to the set input of flip-flop 171 whose output line 172 now becomes energized. (The reset signal transmitted by line 240 was merely a pulsed signal and no longer appears at the reset input when the signal arrives at the set input.) In like manner when the G5 level is reached the output line 178 of flip-flop 177 is energized so that three lines within the logic box, namely lines 272, 276, 278, are energized with these lines remaining energized until reset signals are received at the reset inputs of the respective flip-flops 238, 177, 171.

Now, with the exhaust valve closed, the wheel acceleration is reduced as the result of the continued choked build up of pressure in the brake chamber through the choke 44, and as the acceleration level falls below the reference levels of G5, G4 and G2 comparators, each is successively switched to a non-conducting condition which, as already explained, has no effect on any of the connected flip-flops which are already in set condition.

With lines 272, 276, 278 energized in the logic box, it will be seen that only AND gate 282 of the four connected to OR gate 296 leading to the upper logic box output line 174 will have positive signals at each of the inputs, the branch lines 316, 300 to two of the AND inputs receiving positive signals from the energized lines 276, 272 and the third input receiving a positive signal from the output of the inverter 312 in branch line 308 which is connected to the still de-energized line 274. When one traces through the circuitry to the inputs of each of the other AND gates 280, 284, 286 it will be found that at least one input of each gate has a zero signal. For example, the inverter 304 converts the positive signal in branch line 298 to zero at the lower input of AND gate 280; at AND gate 284 the branch lines 318, 310 to two inputs have zero signals, branch 318 being connected downstream of inverter 320 and branch 310 being connected to de-energized line 274; at AND gate 286 the lower branch line 324 is connected to energized line 278 downstream of inverter 326 whose output is zero.

With AND gate 282 being thus conducting, a signal is fed through OR gate 296 to energize logic box output line 174 and the upper input of AND gate 208 in the control box in readiness for the next G1 signal.

By tracing the circuitry through the logic box it can be determined that when lines 272, 276, 278 are energized, as above described, the logic box output line 175 leading to one input of the other AND gate 210 in the control box is de-energized so that gate 210 will not conduct on the next G1 signal. That line 175 is de-energized in the described situation can be proved by demonstrating that the two lines 330, 332 leading to OR gate 328 in the logic box are de-energized. Line 330 is obviously de-energized because it is connected to energized line 278 downstream of inverter 326. Line 332 can only be energized if both inputs of AND gate 334 are positive. The upper input is positive because branch line 336 is connected to energized line 272. The second input, however, is derived from line 338 connected to OR gate 340, the upper input of which is zero because branch line 342 is connected to de-energized line 274. The lower input of OR gate 340 is also zero because it is connected to energized line 276 downstream of inverter 320 which converts the positive signal in line 276 to zero at the output of the inverter. It will be seen from the foregoing that OR gate 340 passes no signal and the input supplied by line 338 to the lower input of AND gate 334 is therefore zero so that its output line 332 is also zero and logic box output line 175 must therefore be de-energized.

Now when the wheel slows to the second G1 level at the point 106 in FIG. 2 only the G1 signal received at the lower input of upper AND gate 208 has any effect and the signal thus passed by gate 208 sets flip-flop 216 to energize its output line 220 and effect opening of the small exhaust valve, this being the next smaller exhaust area from that opened in the preceeding cycle, which was the intermediate area obtained by opening only the large exhaust valve as already explained.

With the output line 220 energized the branch 228 to one input of AND gate 232 is also energized. Immediately after the pulsed G1 signal has passed by means of the AND gate 208 to set flip-flop 216, the pulsed signal decays to zero. However, while the signal was positive the inverter 257 in line 200 converted this positive signal to zero but as soon as the G1 signal upstream of the inverter has decayed to zero the output of the inverter becomes positive and one-shot 258 provides a pulsed signal by means of OR gate 260 in line 264, 266 to the reset input of the flip-flops 236, 238 to extinguish the signal in line 168 leading to the logic box. The reset signal has no effect on the output of flip-flop 236 because this is already at zero and will remain so until the branch line 242 leading to the second input of AND gate 232 becomes energized. (It will be recalled that the other input of gate 232 through branch 228 is already energized by the signal locked into line 220 by the set condition of flip-flop 216.)

As the wheel accelerates beyond the conducting level of the G1 comparator so that its output now becomes zero, this signal is converted to a positive signal by the inverter 248 in line 246 connected to the output of the G1 comparator. This positive signal is pulsed by one shot 250 in line 246 and passes by means of OR gate 252 to lines 256, 240 and thence to the branch lines 242, 244 leading to one input of each of the respective AND gates 232, 234. Because the other input of AND gate 234 has a zero signal no signal progresses beyond gate 234. However, as soon as the branch line 242 is energized the AND gate 232 conducts and sets flip-flop 236 to energize the line 167 leading to the logic box.

The signal in line 240 effecting the set of flip-flop 236 is also fed to the reset inputs of the flip-flops 171, 177 connected to the respective G4, G5 comparators. When these flip-flops are reset, the signals previously locked into output lines 172, 178 by acceleration of the wheels to the G4 and G5 levels are extinguished.

When the wheel again accelerates to the G2 level, that is to say, to the point 108 in FIG. 2, a signal is sent from the G2 comparator by way of line 169, OR gate 267 and lines 269, 270 to the reset inputs of flip-flops 216, 218. This extinguishes the signal in output line 220 thus de-energizing the small exhaust valve solenoid to close the small exhaust valve. The reset signal has no effect on the output of flip-flop 218 because this is already at zero.

Let it now be assumed that when only the small exhaust valve was opened as demonstrated above, insufficient pressure was released from the brake chamber and the wheel acceleration peaked without reaching the G4 level, tha is to say, the wheel only reached the acceleration peak 110 of FIG. 2.

Referring now to FIG. 4, with the line 167 to the logic box energized, the line 168 de-energized as are also lines 172, 178 because of the failure of the wheel to accelerate to the G4, G5 levels, it will be apparent by tracing the circuitry through in the logic box that only the lower output line 175 from the box is energized. For example with the line 274 in the logic box energized and the lines 272, 276, 278 at zero, it can be seen that each of the AND gates 280, 282, 284, 286 have at least one zero input and are thus non-conducting. However, the line 278 downstream of inverter 326 is energized and this signal is passed directly to the lower output line 175 by way of branch lines 330 and OR gate 328. Now when the next G1 signal is produced at the point 112 in FIG. 2, only th large exhaust valve is opened and immediately thereafter a delayed signal resets flip-flop 236 to de-energize line 167.

When the output of the G1 comparator becomes zero, the flip-flop 238 is now set to lock in a signal in the line 168. As can be seen, if the wheel were to again no accelerate to the G4 level the upper logic output line 174 would be energized through AND gate 286 whose upper input would be positive through energized lines 168, 272 and whose lower input would be positive by the inverted zero signal in line 278. The lower logic box output line 175 would also be energized by the inverted zero signal in line 278 as previously explained. Thus at the next G1 signal both the small and large exhaust valve would be open which is the intended result; that is to say, when the wheel failed to reach the optimum G4 level during the last cycle, the next larger exhaust area is opened at the next G1 signal in order that the wheel will have an opportunity to accelerate to the desired level during the next cycle.

However, in the example illustrated in FIG. 2, it will be recalled that when the intermediate exhaust area was opened at the G1 point 112, the wheel did accelerate to the G4 level but not to the G5 level. Referring now to FIG. 4 it will be seen that when the G4 comparator becomes conducting to set flip-flop 171 and energize lines 172, 278 the positive signal at the input of inverter 326 becomes a zero at the output so that the second input of AND gate 286 which has just been positive becomes zero and the signal set in line 174 at the last G1 level is cancelled so that instead of opening both exhaust valves at the enxt G1 only the intermediate exhaust area, that is to say, only the large exhaust valve is opened which is the same exhaust area as was opened during the last cycle. This is in accordance with the intended purpose of the invention which is constructed and arranged to open the same exhaust area as last time whenever wheel acceleration reaches the level of G4 but not G5.

If the wheel acceleration fails to reach G4, it has been demonstrated herein that the system functions to open the next larger exhaust area at the next G1 and that when the wheel accelerates beyond the G5 level, the system functions to open the next smaller exhaust area at the next G1. Additionally, should the wheel accelerate to the extraordinary high level of the G3 comparator 129 in FIG. 3, as has been explained, the supply valve is opened to rapidly increase the pressure in the brake chamber.

In view of the foregoing detailed explanation, it is not believed necessary to further describe the operation of the system as this can be readily determined by tracing the circuitry for any possible combination of energized input lines to the logic box.

As already demonstrated, when the brake pedal is released to de-energize the brake switch lines 138, 140, the zero signal therein is inverted 142 in FIG. 3 and the inverter 194 in FIG. 4 (these could be the same component) to reset all the flip-flops in the circuit to effect opening of the supply valve, closing of both exhaust valves, and de-energization of all inputs to the logic box in readiness for the next adaptive mode of brake operation.

It should be understood that desirably each braked wheel should be provided with the circuitry described herein so that each wheel is controlled separately from every other. However, the system of the invention is susceptible of use in a variety of configurations, for example, to effect joint control by a single system of a plurality of wheels, and is not limited to any particular manner of use.

Those skilled in the art will recognize that the logic components shown and described are representative only in that other components for accomplishing the same results could be readily used in lieu of the components illustrated.

What is claimed is:

1. For use in an adaptive braking system, the combination of a fluid pressure operated brake actuator having an exhaust port, and a supply port adapted to be connected to a source of fluid pressure, modulating valve means for controlling the fluid pressure in said actuator in the event of an incipient skid, said modulating valve means comprising a supply valve and exhaust valve for the respective supply and exhaust ports, each of said valves including a valve member for closing its port in opposition to pressure at said port tending to open said valve, a fluid pressure cavity for each of said valve members, a fluid pressure responsive element in each cavity and operatively connected to a valve member to move it to closed position in response to fluid pressure of a pre-determined value in said cavity applying a force acting on said elements in excess of the fluid pressure force at said port tending to open said valve member, a pair of valve seats surrounding ports connecting said cavity to the interior of the actuator and to exhaust, respectively, a double acting valve element movable between said seats to connect said cavity to one of said ports while disconnecting it from the other and vice versa, and signal actuated means responsive to signals established by wheel deceleration and acceleration and operatively connected to each of said valve elements to move said element out of engagement with one seat and into engagement with the other to effect opening and closing of said valve members in response to the presence or absence of actuator pressure in each of said cavities.

2. The combination of claim 1 incluidng a bleed port providing continuous open communication between the interior of said actuator and said supply port upstream of the valve member controlling said port whereby fluid pressure continuously bleeds at a controlled rate from said source of fluid pressure into said actuator whenever the pressure in the latter is less than the pressure from said source.

3. The combination of claim 2 wherein said exhaust port has a cross-sectional area of a pre-determined size so that when said exhaust valve member is open pressure fluid is exhausted from said actuator at a restricted rate determined by the area of said exhaust port, and a second exhaust port of a pre-determined cross-sectional area different from the area of said first exhaust port, a normally closed valve member controlling said second port and including wheel deceleration responsive valve control means therefore, said exhaust valve members being openable in response to wheel deceleration signals either singly or concertedly to afford a first exhaust area when the valve for the smaller port is opened, a second exhaust area when the valve for the larger port is opened and a third exhaust area when both valves are concertedly opened.

4. The combination of claim 1 wherein the motive area of the fluid pressure responsive element in each cavity is greater than the motive area of the respective valve members exposed to the pressure at their respective ports.

5. The combination of claim 4 including spring means acting on each of said valve members to bias it towards its closed position.

* * * * *